May 19, 1953  E. R. FREDERICK ET AL  2,638,963
APPARATUS FOR DIELECTRIC FABRICATION
Filed March 31, 1949
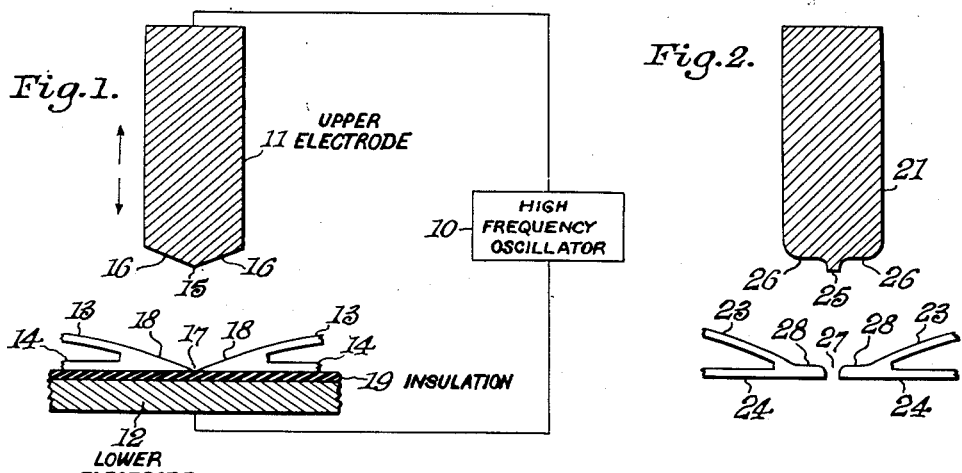
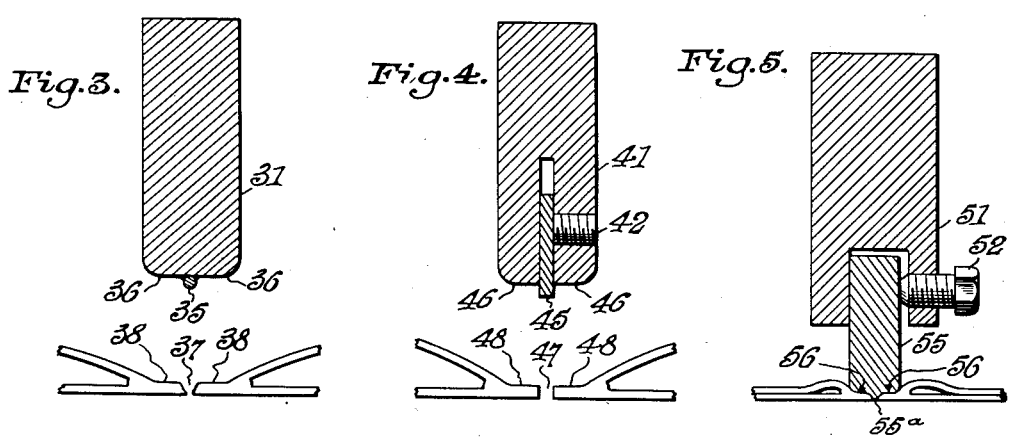
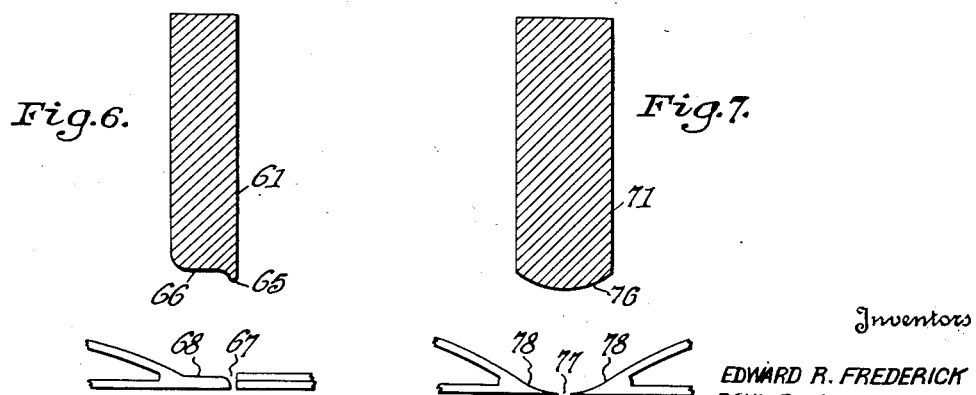
Inventors
EDWARD R. FREDERICK
PAUL R. MALMBERG
By Harry M. Saragovitz
ATTORNEY Patented May 19, 1953

2,638,963

UNITED STATES PATENT OFFICE 2,638,963

APPARATUS FOR DIELECTRIC FABRICATION

Edward R. Frederick and Paul R. Malmberg, Pittsburgh, Pa., assignors to the United States of America as represented by the Secretary of the Army Application March 31, 1949, Serial No. 84,636

6 Claims. (Cl. 154—42)

This invention relates to methods and means for the dielectric sealing of thermoplastic sheets or plies.

Broadly, this invention operates upon the well-known principle that when thermoplastic dielectric material is interposed within a high frequency electric field heat is generated within the material. Thus, if a plurality of adjacent plies of such material are placed within this field, the heated material flows between the plies to bond or seal them together. Such a high frequency field is set up between spaced electrodes which are coupled to a source of high frequency oscillations. This heating principle has been successfully applied to the sealing of wood, rubber, synthetic resins and other materials.

An object of this invention is to provide an improved process and apparatus for the dielectric fabrication of thermoplastic materials wherein arcing between the electrodes is effectively inhibited.

A further object of this invention is to provide such an improved process and apparatus whereby any combination of the functions of sealing, cutting and gauging seal thickness may be accomplished by the electrodes in a single operation.

Another object of this invention is to extend the applicability of dielectric sealing equipment and methods to the fabrication of certain thermoplastic materials which, by virtue of their thinness, porosity, low power factor, low dielectric strength, or high thermal conductivity, or any combination of these factors, have been difficult or impossible to fabricate by former dielectric methods.

In present dielectric sealing practice with bar type equipment, bonding of thermoplastic plies is accomplished by placing the plies on a metal plate, often made of brass, which serves as the lower electrode. The upper electrode, consisting of a metal bar which is either straight or shaped to the contour of the desired seam, is then brought down edgewise on top of the thermoplastic plies by means of a press. A high frequency voltage applied across the two electrodes causes heating within the material of the plies due to dielectric losses therein, and the resulting seal at the adjacent faces of the plies is a positive weld. In practice at the present time, the materials to be joined are either pre-cut to the desired shape or the excess material is trimmed after the sealing operation is completed. In either case, a cutting or trimming operation in addition to the sealing operation is required to complete the fabrication. This is also true where rotary electrodes are employed between which the material passes.

The present invention overcomes the limitations of the prior art by sealing, cutting and gauging the seal thickness in a single operation.

Further objects and advantages of this invention will be apparent from a study of the following description, claims and drawings, wherein:

Figure 1 is a schematic view, showing the sealing electrodes in cross section, of one form of the apparatus just after the sealing and cutting operation has taken place.

Figure 2 is a similar view of a modified form wherein only the upper electrode and the sealed material are shown.

Figure 3 is a view similar to Figure 2 of still another modification of the upper electrode.

Figure 4 shows still another modified form of the upper electrode.

Figure 5 shows a view similar to Figure 2 of yet another modification at the instant the upper electrode engages the material to be sealed.

Figure 6 shows a further modification of the apparatus.

Figure 7 shows a modification similar to that of Figure 1.

In this disclosure no specific apparatus for moving either or both of the electrodes relative to each other has been shown since any convenient means may be used for so moving them. Thus, the electrodes of our invention may be used with hand operated pivoted jaws adapted to be moved together to seal the plies together, or the electrodes may be mounted on the jaws of a hand, pedal or power operated press. Also, one or both of the electrodes may be rotary disks with the material to be sealed passing between them. In this last-mentioned type the sealing face of one of the rotary disk electrodes may be covered with the arc-preventing insulation, while the sealing surface of the other electrode may be shaped to perform the simultaneous sealing and cutting operation. Also, if desirable, a continuous or intermittent feed mechanism for feeding the material to be sealed into and away from the sealing position may be employed.

Likewise the connection between the source of high frequency oscillations and the electrodes has been only schematically indicated, without any intention to limit the invention thereby. It is to be understood that the electrodes may be coupled in any desired manner to the high frequency oscillator, with suitable control circuits for controlling the electric field impressed between the electrodes, as desired.

In the following discussion, for the sake of convenience, the electrodes will be identified as "upper" and "lower," respectively, but as pointed out above, any suitable arrangement of the electrodes may be used. The invention is not to be limited to the use of electrodes spaced one above the other by the use of this terminology, but rather the discussion is limited to such type in order to simplify the disclosure.

Figure 1 shows a source of high frequency oscillations 10 coupled to upper electrode 11 and lower electrode 12. By suitable means (not shown) upper electrode 11 may be reciprocated relative to the lower electrode 12.

Positioned on lower electrode 12 is a thin continuous layer of suitable electrical insulating material 19 of high dielectric strength and resistance to sealing temperatures. Between this insulating layer 19 and the upper electrode the plies 13, 14 to be sealed are positioned. Insulating layer 19 extends so as to be interposed between any unused portions of either electrode, whereby to inhibit arcing between them. This insulating layer facilitates dielectric sealing operations where the electrodes are not shielded at all points from each other by the sealable material. This is especially valuable where the sealable material comprises weaved plastic fabrics, or plastic films which are porous or have pinholes or other imperfections, or belts and similar items where one or more transverse seals are to be made on each of several belts placed side by side on the lower electrode.

In addition to preventing arcing between unused electrode portions, use of insulating layer 19 also enables the upper electrode to be lowered into direct physical contact with the upper surface (insulating layer 19) of the lower electrode assembly. This feature enables the cutting of the sealable layers or plies 13, 14 in the same movement which effects the sealing. After upper electrode 11 is brought down near or onto the thermoplastic sheets 13, 14 a high frequency voltage from oscillator 10 is applied across the electrodes. This voltage sets up a high frequency field which heats and softens the material of layers 13, 14. This softening permits the upper electrode to penetrate the material of layers 13, 14 until the cutting edge 15 of that electrode comes to rest against the upper surface of insulation 19. Due to the heating effect in the thermoplastic material adjacent sealing faces 16 of the upper electrode, the fused portions 18 are formed with a break 17 therebetween caused by cutting edge 15. After the cutting edge 15 has come to rest against insulation 19, the high frequency voltage across the electrodes may be continued to be applied in order that the heating and melting action may progress to form seals 18 of optimum strength between layers 13, 14. When the voltage is no longer applied the upper electrode is withdrawn to the position shown in Figure 1.

The type of upper electrode shown in Figure 1 may be applied to layers of plastic film, of sheets of material, which are of different thicknesses without need for any mechanical adjustments of the sealing apparatus, and have been found to produce essentially the same character of seal in each.

In the remaining figures, the lower electrode and the insulating layer are not shown in order that the various types of seals and cuts may be more clearly shown.

In Figure 2 has been shown an upper electrode which is capable of cooperating with the lower electrode to simultaneously seal and cut the superposed thermoplastic layers, and also to gauge the thickness of the seal thus formed. In Figure 2 the parts are shown as they appear after the combination sealing, cutting and gauging operation has occurred. In the completed seal shown in Figure 2, the break 27 has resulted from the complete penetration of plies 23, 24 by the cutting projection 25 of electrode 21, and the sealed areas 28 have been formed adjacent each upper electrode sealing face 26. The extent to which cutting projection 25 extends below horizontal bottom faces 26 on the electrode 21 determines the thickness of the sealed portions 28. Cutting projection 25 therefore gauges the thickness of the seal.

In Figure 3 a similar view of a modified form of the apparatus is shown. In this modification the cutting projection consists of a cylindrical wire 35 which is soldered along the center of the lower sealing face 36 of the upper electrode 31. The diameter of wire 35 therefore determines the thickness of the sealed portions 38.

In Figure 4 there is shown an upper electrode having an adjustable cutting blade. Set screw 42 bears against the cutting blade 45 which is slidably adjustable in a cavity in the upper electrode 41. Blade 45 is of electrically conductive material and performs a function similar to that of cutting projections 25 and 35, except that in this instance the effective cutting depth of blade 45 can be adjusted by loosening the set screw and adjusting the extent to which blade 45 protrudes below bottom face 46 of the upper electrode.

Figure 5 shows a modification similar to that of Figure 4 and having a similarly adjustable electrically conductive cutting blade 55. Sealing surface 56, having a protrusion 55a, is formed as the bottom face of the cutting blade. The lower face of upper electrode 51 does not contact the sealable material in this species. Protrusion 55a effects the cutting or separation of the sealable material.

In Figure 6 is shown a modification in which the plies of material are sealed on only one side of the cut edges, whereas on the other side they remain unsealed. Only one sealing face 66 is formed on the electrode 61, since cutting edge 65 is proximate one perpendicular edge of the electrode. In order to produce this type of seal and cut, it is sometimes necessary to increase the thickness of the electrical insulating layer which is positioned below the sheets to be sealed.

Figure 7 shows a modification in which the upper electrode is similar to that of Figure 1. However, in this embodiment the sealing surface 76 is a continuous curved surface with no well-defined cutting edge. It has been found that this electrode is adapted for sealing sheets of different thicknesses, but it is most suitable for use with thin material.

In each modification of the apparatus, the insulating layer 19 is positioned between the lower electrode 12 and the thermoplastic sheets to be sealed. This electrical insulating layer 19 must possess certain electrical and physical characteristics, chief of which is high dielectric strength at high and very high radio frequencies. It must also have good dimensional stability and resistance to moderately high temperatures. Characteristics of secondary importance include high dielectric constant, low power factor, and surfaces which are polished and true. In using this method on thin material (not exceeding .006 inch in thickness) an insulating material meeting the above requirements, and, in addition, having low thermal conductivity, is necessary in order to obtain the best results. The preferred material of this type is a Fiberglass cloth—silicon resin laminate ranging in thickness from 0.10 inch to 0.20 inch. Other suitable materials may be composed of mica, silicone resin laminated or bonded mica, Micarta, Formica, and vitreous coatings.

The electrical insulating layer 19 not only electrically insulates the electrodes from each other but also thermally insulates the thermoplastic sealable material from the cold surface of the lower electrode. The lower surface of lower thermoplastic sheet 14 which is in contact with the upper surface of insulating layer 19 will, therefore, generally be at a higher temperature during the period of dielectric heating than the top surface of the upper thermoplastic sheet 13 which directly contacts the cold upper electrode. That is, the heat generated in upper sheet 13 during the period that the high frequency voltage is impressed across the electrodes may be quickly conducted away by the cold upper electrode, while the heat generated in lower sheet 14 during that period is not conducted away by thermal insulating layer 19. In certain instances the temperature of the lower surface of lower thermoplastic sheet 14 may even exceed that of the inner surfaces of sheets 13 and 14 which are to be fused together. Thus, an effective seal or weld may be prevented. Under such conditions it is necessary either to place insulating layers over both electrodes, or the upper electrode (the one not provided with an insulating layer) must be heated by secondary means in order to maintain a suitable high temperature of the upper sheet 13 of the sealable material to thereby secure the optimum temperature distribution through the thermoplastic material at the areas to be sealed.

In using my invention in sealing plastic materials which are not less than approximately .006 inch in thickness, an insulating layer 19 which has satisfactory electrical properties and which also has high thermal conductivity may be used to produce seals of optimum strength. For such use a steel electrode having a porcelain enamel layer of approximately .010 inch thickness is preferred. Temperature control of both electrodes by secondary means is desirable in order to provide optimum temperature distribution through the thermoplastic sheets at the areas to be sealed.

In this discussion the operating parameters have not been presented because of the variety and range of the factors involved, some of which are dependent upon the type of machine being used and the kind of material being fabricated. Moreover, several of the electrical parameters may be measured only by costly electrical equipment (such as Q-meters and high frequency, high voltage voltmeters) which may not be available to the ordinary user of dielectric sealing equipment. The variables involved are all interrelated and adjustment of the controllable conditions to produce a satisfactory seal must be determined on the job by a person skilled in the art. Factors which influence the quality of the seal include: the electrical, physical and thermal properties of the thermoplastic material being fabricated; electrical, physical and thermal properties of the insulating layer; sealing area of the electrodes; temperature of the electrodes; voltage, current, frequency, and phase angle of the output of the high frequency generator; length of time the high frequency voltage is applied to the electrodes; force exerted by the press on the electrodes, and many other factors of secondary importance.

Having thus described our invention and specific modifications of the apparatus employed, it will be apparent to those skilled in the art that further modifications may be made without departing from our invention as defined in the appended claims.

What is claimed is:

1. In apparatus for fabricating thermoplastic dielectric material, two relatively movable electrodes, a source of high frequency voltage, means to apply said voltage across said electrodes, one of said electrodes having a flat surface provided with a heat resistant electrical insulating cover, the other of said electrodes having a substantially flat surface provided with a ridge thereon, means for moving said electrodes convergently into a position wherein said surfaces are substantially parallel so that said ridge cuts and determines the thickness of said material contacted by said other electrode.

2. Apparatus as in claim 1 wherein the top of said ridge is substantially flat.

3. Apparatus as in claim 1 wherein the top of said ridge is substantially rounded.

4. Apparatus as in claim 1 wherein the height of said ridge is adjustable.

5. Apparatus as in claim 1 wherein said ridge is positioned at one edge of said flat surface of said other electrode.

6. Apparatus as in claim 1 wherein said material consists of a plurality of plys.

EDWARD R. FREDERICK.
PAUL R. MALMBERG.

References Cited in the file of this patent

UNITED STATES PATENTS

| Number | Name | Date |
|---|---|---|
| 2,354,714 | Strickland | Aug. 1, 1944 |
| 2,401,991 | Walton | June 11, 1946 |
| 2,439,918 | Auxier | Apr. 20, 1948 |
| 2,446,623 | Welch | Aug. 10, 1948 |
| 2,457,659 | Graham et al. | Dec. 28, 1948 |
| 2,510,383 | Dalgleish | June 6, 1950 |
| 2,517,672 | Jenkins | Aug. 8, 1950 |
| 2,552,353 | Troth et al. | May 8, 1951 |

FOREIGN PATENTS

| Number | Country | Date |
|---|---|---|
| 555,054 | Great Britain | Aug. 3, 1943 |
| 664,128 | Great Britain | Jan. 2, 1952 |